US009177202B2

(12) United States Patent
Hanita et al.

(10) Patent No.: US 9,177,202 B2
(45) Date of Patent: Nov. 3, 2015

(54) RED-EYE DETECTION DEVICE

(75) Inventors: Kiyoto Hanita, Susono (JP); Yoshinao Takemae, Yokohama (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/232,175

(22) PCT Filed: Jul. 11, 2011

(86) PCT No.: PCT/JP2011/065823
§ 371 (c)(1),
(2), (4) Date: Jan. 27, 2014

(87) PCT Pub. No.: WO2013/008303
PCT Pub. Date: Jan. 17, 2013

(65) Prior Publication Data
US 2014/0147019 A1  May 29, 2014

(51) Int. Cl.
*G06K 9/00* (2006.01)
*G06T 7/00* (2006.01)
*G06T 7/40* (2006.01)

(52) U.S. Cl.
CPC .......... *G06K 9/00604* (2013.01); *G06K 9/0061* (2013.01); *G06K 9/00845* (2013.01);
(Continued)

(58) Field of Classification Search
CPC . G06K 9/00604; G06K 9/0061; G06K 9/036; G06K 9/3208; G06K 9/00281; G06K 9/00288; G06K 9/00248; G06K 9/00597; G06T 2207/10016; G06T 7/2006; G06T 7/204; G06T 7/0081; G06T 2207/30201; G06T 7/0002; G06T 2207/30216; G06T 7/0046; H04N 5/2226; H04N 1/624; H04N 2201/3252; H04N 5/367; G08B 21/06; A61B 3/113; A61B 5/1103; A61B 5/6821

USPC .......... 382/103, 104, 117, 167, 190, 254, 275
See application file for complete search history.

(56) References Cited

U.S. PATENT DOCUMENTS 5,008,946 A * 4/1991 Ando ............................. 382/104
5,805,720 A * 9/1998 Suenaga et al. ............... 382/117
(Continued)

FOREIGN PATENT DOCUMENTS

| JP | 2004 234494 | 8/2004 |
|----|-------------|--------|
| JP | 2006 251926 | 9/2006 |
| JP | 2007 281847 | 10/2007 |

OTHER PUBLICATIONS

Qiong Wang, et al., "Driver Fatigue Detection: A Survey", Proceedings of the 6th World Congress on Intelligent Control and Automation, Jun. 21-23, 2006, Dalian, China, pp. 8587-8591.

(Continued)

*Primary Examiner* — Barry Drennan
*Assistant Examiner* — Aklilu Woldemariam
(74) *Attorney, Agent, or Firm* — Oblon, McClelland, Maier & Neustadt, L.L.P.

(57) ABSTRACT

An ECU connected to an image sensor includes a face position and face feature point detection unit that detects the feature points of the face of the driver, a red-eye detection unit that detects the red eye with template matching using a red-eye template, an eye opening degree calculation unit that calculates the degree of eye opening, a relative eye opening degree calculation unit that calculates the relative degree of eye opening which is 0% in an eye-closed state and is 100% in an eye-open state, and a red-eye template update unit that generates a red-eye template on the basis of the relative degree of eye opening and updates a red-eye template used for the next template matching with the generated red-eye template.

4 Claims, 18 Drawing Sheets

(52) U.S. Cl.
CPC ............. *G06T 7/0081* (2013.01); *G06T 7/0085* (2013.01); *G06T 7/408* (2013.01); *G06K 9/00* (2013.01); *G06T 2207/30041* (2013.01); *G06T 2207/30216* (2013.01)

(56) References Cited

U.S. PATENT DOCUMENTS

| | | | | |
|---|---|---|---|---|
| 5,990,973 | A * | 11/1999 | Sakamoto | 348/576 |
| 6,278,491 | B1 * | 8/2001 | Wang et al. | 348/370 |
| 6,717,518 | B1 * | 4/2004 | Pirim et al. | 340/576 |
| 7,024,035 | B1 * | 4/2006 | Enomoto | 382/167 |
| RE42,471 | E * | 6/2011 | Torch | 340/575 |
| 2003/0223635 | A1 * | 12/2003 | Russon et al. | 382/167 |
| 2004/0179716 | A1 | 9/2004 | Tafuku et al. | |
| 2005/0220346 | A1 * | 10/2005 | Akahori | 382/190 |
| 2006/0008169 | A1 * | 1/2006 | Deer et al. | 382/254 |
| 2006/0017825 | A1 * | 1/2006 | Thakur | 348/242 |
| 2006/0072815 | A1 * | 4/2006 | Wu et al. | 382/167 |
| 2006/0204042 | A1 * | 9/2006 | Hammoud et al. | 382/107 |
| 2007/0036438 | A1 * | 2/2007 | Thakur | 382/190 |
| 2008/0151186 | A1 * | 6/2008 | Adachi et al. | 351/206 |
| 2008/0253651 | A1 * | 10/2008 | Sagawa | 382/167 |
| 2008/0317378 | A1 * | 12/2008 | Steinberg et al. | 382/275 |
| 2010/0202658 | A1 * | 8/2010 | Ishida et al. | 382/103 |
| 2010/0220892 | A1 * | 9/2010 | Kawakubo | 382/103 |
| 2011/0216181 | A1 * | 9/2011 | Yoda et al. | 348/78 |

OTHER PUBLICATIONS

Martin Eriksson, et al., "Eye-Tracking for Detection of Driver Fatigue", Intelligent Transportation System, 1997.ITSC'97., 1998 IEEE, pp. 314-319.

Mohamad Hoseyn Sigari, "Driver Hypo-Vigilance Detection based on Eyelid Behavior", 2009 Seventh International Conference on Advances in Pattern Recognition, 2009.ICAPR'09., IEEE, 2009, pp. 426-429.

Danijela Vukadinovic, et al., "Fully Automatic Facial Feature Point Detection Using Gabor Feature Based Boosted Classifiers", Systems, Man and Cybernetics, 2005 IEEE International Conference on. IEEE, 2005, pp. 1692-1698.

Carlos H. Morimoto, et al., "Automatic Iris Segmentation Using Active Near Infra Red Lighting", Proceedings of the XVIII Brazilian Symposium on Computer Graphics and Image Processing, SIBGRAPHI'05, IEEE, 2005, pp. 37-43.

International Search Report Issued Oct. 18, 2011 in PCT/JP11/065823 Filed Jul. 11, 2011.

Zhiwei Zhu, et al., "Robust real-time eye detection and tracking under variable lighting conditions and various face orientations" Computer Vision and Image Understanding 98, 2005, pp. 124-154.

\* cited by examiner

RED-EYE DETECTION DEVICE

TECHNICAL FIELD

The present invention relates to a red-eye detection device that detects a red eye with template matching using a red-eye template.

BACKGROUND ART

In the related art, the face image of the driver is captured by a camera which is fixed to a steering column of the vehicle, the position of the black eye of the driver is detected from the captured image, and the line of sight of the driver is detected, in order to avoid the crash of the vehicle.

However, a red-eye phenomenon occurs, for example, at night where the amount of light outside the vehicle is small. Therefore, it is necessary to detect the red eye of the driver from image information in order to detect the line of sight of the driver at night where the amount of light outside the vehicle is small.

In the related art, the red eye has been detected by template matching using a red-eye template (for example, see Patent Literature 1).

CITATION LIST

Patent Literature

[Patent Literature 1] Japanese Unexamined Patent Application Publication No. 2007-281847

SUMMARY OF INVENTION

Technical Problem

However, the shape of the red eye in the image varies depending on the degree of eye opening. Therefore, when template matching is performed using a single red-eye template, the red eye cannot be appropriately detected by the degree of eye opening. On the other hand, when template matching is performed using a plurality of red-eye templates corresponding to all of the degrees of eye opening, a processing speed is significantly reduced, which is not practical.

An object of the invention is to provide a red-eye detection device which can detect the red eye with high accuracy even when the shape of the red eye varies depending on the degree of eye opening.

Solution to Problem

A red-eye detection device according to the invention detects a red eye from a face image with template matching using a red-eye template and includes red-eye template generation means for generating the red-eye template corresponding to the degree of eye opening.

According to the red-eye detection device of the invention, the red-eye template corresponding to the degree of eye opening is generated. Therefore, even when the shape of the red eye varies depending on the degree of eye opening, it is possible to detect the red eye with high accuracy.

In this case, the red-eye template generation means may update the red-eye template used for the next template matching with the generated red-eye template. According to this structure, since the red-eye template corresponding to the degree of eye opening can be used in the next template matching, it is possible to improve the accuracy of detecting the red eye.

The red-eye detection device may further include eye opening degree calculation means for calculating a degree of eye opening from the image. As such, since the degree of eye opening is directly calculated from the image, it is possible to improve the reliability of the degree of eye opening.

In this case, the eye opening degree calculation means may calculate the degree of eye opening on the basis of a relative degree of eye opening which is 0% in an eye-closed state and is 100% in an eye-open state. The distance from the upper eyelid to the lower eyelid in the face image varies depending on the distance from the camera or the difference between individuals. As such, when the degree of eye opening is represented by the relative degree of eye opening, it is possible to normalize the degree of eye opening even though the distance from the upper eyelid to the lower eyelid in the image varies depending on the distance from the camera or the difference between individuals. Therefore, it is possible to appropriately generate the red-eye template.

The red-eye detection device may further include drowsiness degree estimation means for estimating the degree of eye opening on the basis of a degree of drowsiness. In general, the degree of eye opening varies depending on the degree of drowsiness. Therefore, it is possible to indirectly calculate the degree of eye opening from the degree of drowsiness. When the degree of eye opening is estimated from the degree of drowsiness, it is possible to detect the red eye with high accuracy even though the degree of eye opening varies depending on the degree of drowsiness.

The red-eye detection device may further include out-vehicle light amount detection means for detecting the amount of light outside a vehicle, eye opening degree detection means for calculating the degree of eye opening from the face image, and black eye detection means for detecting a black eye from the face image. The red-eye template generation means may learn a correlation between the degree of eye opening and a size of the black eye at a time when the amount of light outside the vehicle detected by the out-vehicle light amount is large and generate a red-eye template with a size corresponding to the degree of eye opening with reference to the correlation at a time when the amount of light outside the vehicle detected by the out-vehicle light amount is small. It is easier to detect the black eye than to detect the red eye and a red eye phenomenon does not occur at the time when the amount of light outside the vehicle is large. Therefore, when the correlation between the degree of eye opening and the size of the black eye is learned at that time, it is possible to appropriately learn the correlation. In addition, since the red-eye template with the size corresponding to the degree of eye opening is generated with reference to the correlation at the time when the amount of light outside the vehicle is small, it is possible to generate the red-eye template corresponding to the degree of eye opening with high accuracy.

Advantageous Effects of Invention

According to the invention, it is possible to detect a red eye with high accuracy even when the shape of the red eye varies depending on the degree of eye opening.

DESCRIPTION OF EMBODIMENTS

Figure 1:
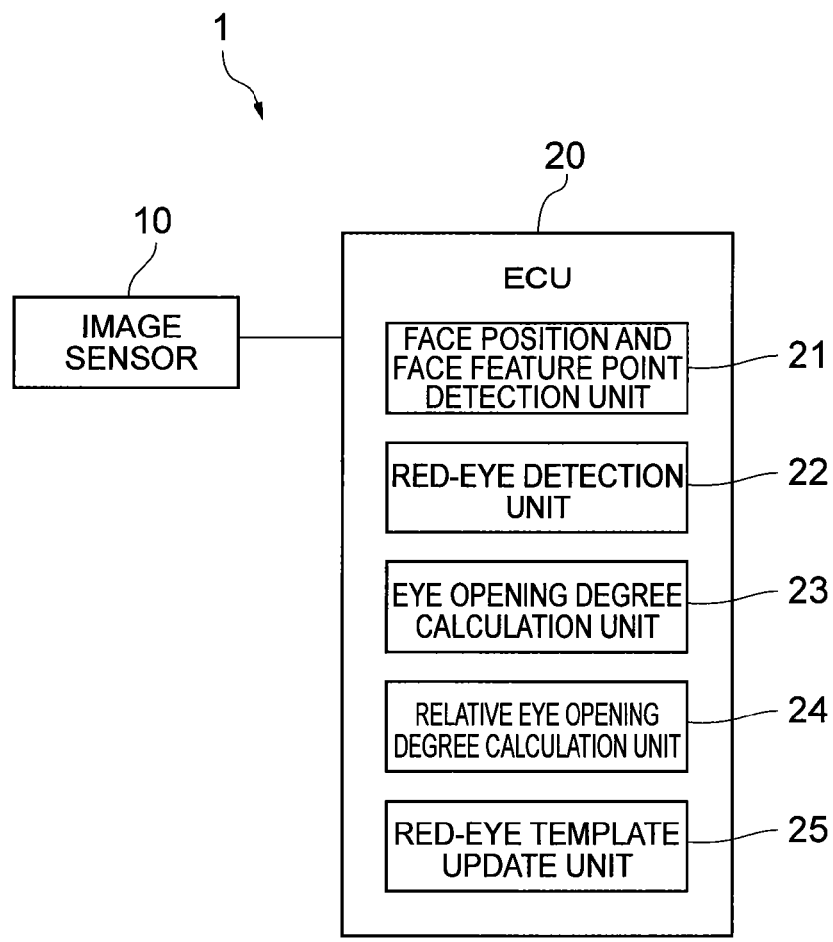
FIG. 1 is a block diagram illustrating the structure of a red-eye detection device according to a first embodiment.

Hereinafter, red-eye detection devices according to embodiments of the invention will be described with reference to the drawings. In the drawings, the same or equivalent components are denoted by the same reference numerals and the description thereof will not be repeated.

The red-eye detection devices according to these embodiments are provided in, for example, a driving support control device which detects the line of sight of the driver and performs driving support control.

[First Embodiment]

FIG. 1 is a block diagram illustrating the structure of a red-eye detection device according to a first embodiment. As shown in FIG. 1, a red-eye detection device 1 according to the first embodiment includes an image sensor 10 and an electronic control unit (ECU) 20.

The image sensor 10 captures the image of the face of the driver. For example, a CCD camera which is fixed to a steering column of the vehicle is used as the image sensor 10. The image (face image) captured by the image sensor 10 includes image information indicating, for example, the position or color information of each pixel. The image sensor 10 outputs the image information of the captured image to the ECU 20.

The ECU 20 is a computer of a vehicle device which performs electronic control and includes, for example, a central processing unit (CPU), a memory, such as a read only memory (ROM) or a random access memory (RAM), and an input/output interface.

The ECU 20 is connected to the image sensor 10 and includes a face position and face feature point detection unit 21, a red-eye detection unit 22, an eye opening degree calculation unit 23, a relative eye opening degree calculation unit 24, and a red-eye template update unit 25.

The face position and face feature point detection unit 21 has a function of detecting the feature points of the face of the driver from the image captured by the image sensor 10. Specifically, first, the face position and face feature point detection unit 21 searches for the position of the face in the entire range of the image captured by the image sensor 10 using a statistical method, such as a neural network method or a boosting method. Then, the face position and face feature point detection unit 21 sets a face position region including the searched position of the face and detects the feature points of the face from the set face position region using the statistical method, such as the neural network method or the boosting method. The feature points of the face include, for example, the outer corner of the right eye, the inner corner of the right eye, the outer corner of the left eye, the inner corner of the left eye, the center of the nasal cavity, and the left and right ends of the mouth. In addition, a method of detecting each feature point of the face is not limited to the above-mentioned method, but other known methods may be used.

The red-eye detection unit 22 has a function of detecting a red eye with template matching using a red-eye template. Specifically, first, the red-eye detection unit 22 sets a red-eye search region from the face position region set by the face position and face feature point detection unit 21, on the basis of the feature points, such as the outer corners of the eyes and the inner corners of the eyes detected by the face position and face feature point detection unit 21. Then, the red-eye detection unit 22 detects the red eye from the red-eye search region with the template matching using the red-eye template.

The eye opening degree calculation unit 23 has a function of calculating the degree of eye opening indicating the degree of eye opening of the driver. Specifically, the eye opening degree calculation unit 23 applies a filter to the face position region set by the face position and face feature point detection unit 21 to generate an edge-enhanced image. Then, the eye opening degree calculation unit 23 projects a plurality of curves connecting the outer corner of the eye and the inner corner of the eye onto the generated edge image and detects the upper eyelid and the lower eyelid from the strength of the edge on the curves. Then, the eye opening degree calculation unit 23 calculates the degree of eye opening [pix] using the difference between the position of the upper eyelid and the position of the lower eyelid. The degree of eye opening is represented in a pixel unit.

The relative eye opening degree calculation unit 24 has a function of calculating the relative degree of eye opening [%] which is 0% in an eye-closed state and is 100% in an eye-open state from the degree of eye opening which is calculated by the eye opening degree calculation unit 23 and is represented in a pixel unit.

The red-eye template update unit 25 has a function of updating the red-eye template on the basis of the relative degree of eye opening calculated by the relative eye opening degree calculation unit 24. Specifically, the red-eye template update unit 25 generates a red-eye template corresponding to the relative degree of eye opening calculated by the relative eye opening degree calculation unit 24. Then, the red-eye template update unit 25 updates the red-eye template used for the next template matching with the generated red-eye template.

Figure 2:
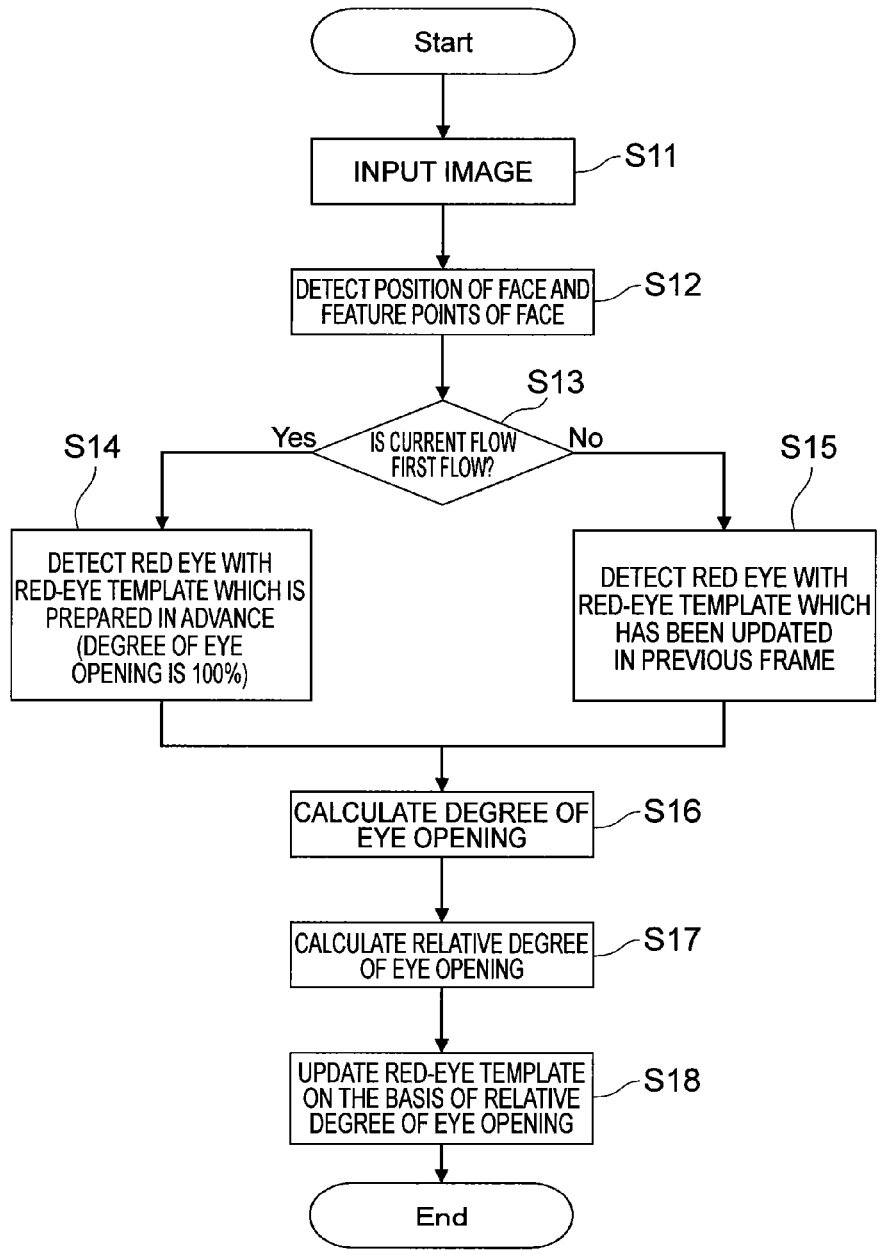
FIG. 2 is a flowchart illustrating a red-eye detection process of the red-eye detection device according to the first embodiment.

Next, the operation of the red-eye detection device 1 according to the first embodiment will be described. FIG. 2 is a flowchart illustrating a red-eye detection process of the red-eye detection device according to the first embodiment. The process shown in FIG. 2 is performed under the control of the ECU 20 and is repeatedly performed at a predetermined interval, for example, during the period from the time when an ignition is turned on to the time when the ignition is turned off. In addition, the unit of a series of processes shown in FIG. 2 is referred to as a frame. Therefore, the current frame means a series of processes shown in FIG. 2 which is currently performed and a previous frame means a series of processes shown in FIG. 2 which has been previously performed.

Figure 3:
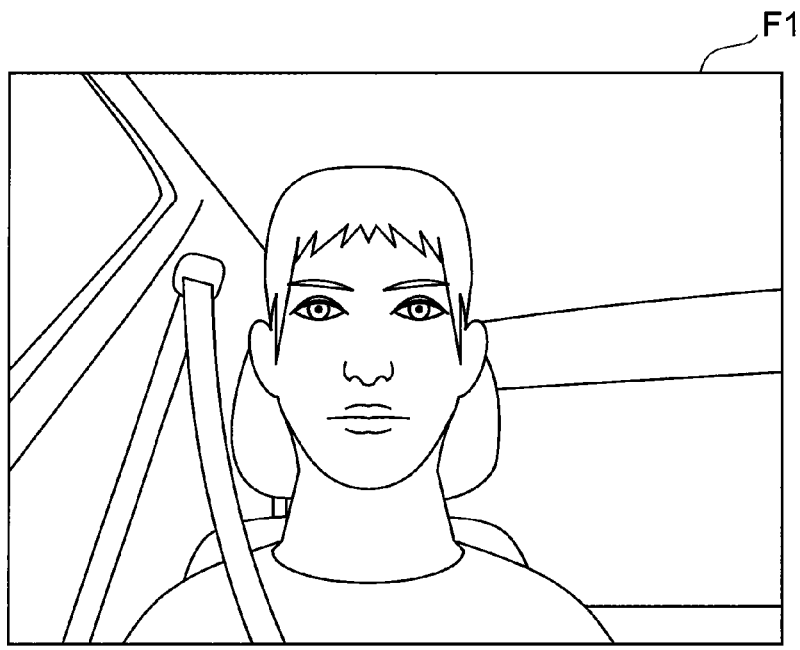
FIG. 3 is a diagram illustrating an example of image information captured by an image sensor.

As shown in FIG. 2, first, the ECU 20 inputs the image of the driver captured by the image sensor 10 (Step S11). In Step S11, an image F1 shown in FIG. 3 which is captured by the image sensor 10 is input. FIG. 3 shows an example of the image captured by the image sensor.

Figure 4:
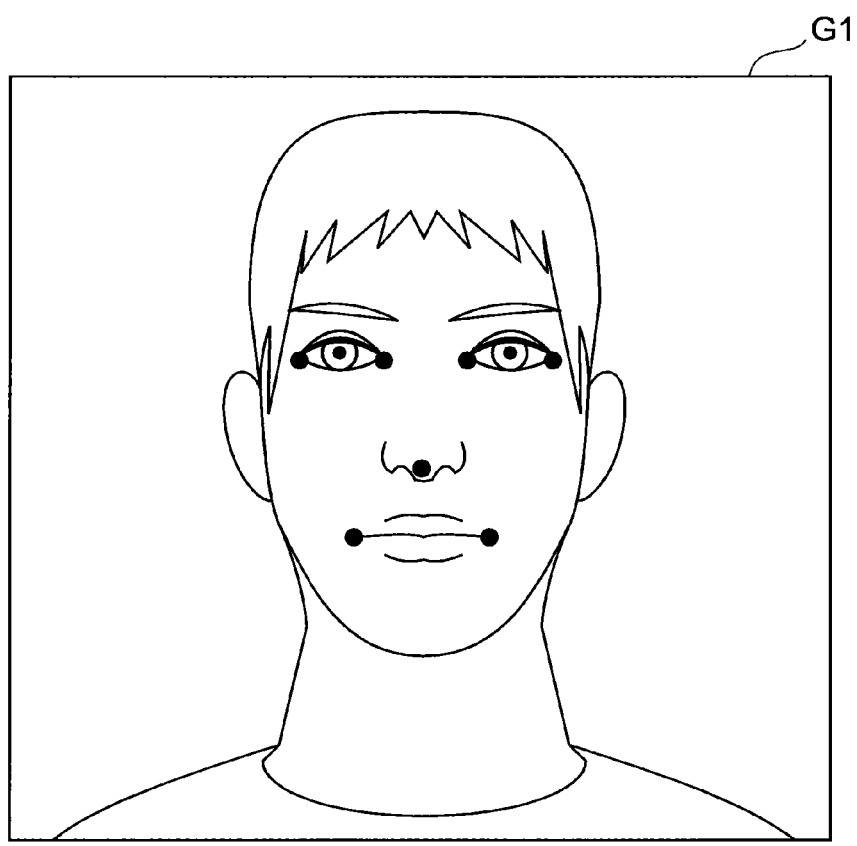
FIG. 4 is a diagram illustrating an example of a face position region.

Then, the ECU 20 detects the position of the face and the feature points of the face (Step S12). The process in Step S12 is performed by the face position and face feature point detection unit 21. First, the face position and face feature point detection unit 21 searches for the position of the face in the entire range of the image F1 input in Step S11 using the statistical method, such as the neural network method or the boosting method. Then, the face position and face feature point detection unit 21 sets a face position region G1. FIG. 4 is a diagram illustrating the outline of a face feature point detection method and shows the face position region G1. As shown in FIG. 4, the face position region G1 includes the searched position of the face and is a region of the image F1. Then, the face position and face feature point detection unit 21 detects the feature points, such as the outer corner of the right eye, the inner corner of the right eye, the outer corner of the left eye, the inner corner of the left eye, the center of the nasal cavity, and the left and right ends of the mouth, in the set face position region G1 as a search range, using the statistical method, such as the neural network method or the boosting method.

Then, the ECU 20 determines whether the current flow is a first flow (Step S13). When it is determined that the current flow is the first flow (Step S13: YES), the ECU 20 proceeds to Step S14. When it is determined that the current flow is not the first flow (Step S13: NO), the ECU 20 proceeds to Step S15.

Figure 5:
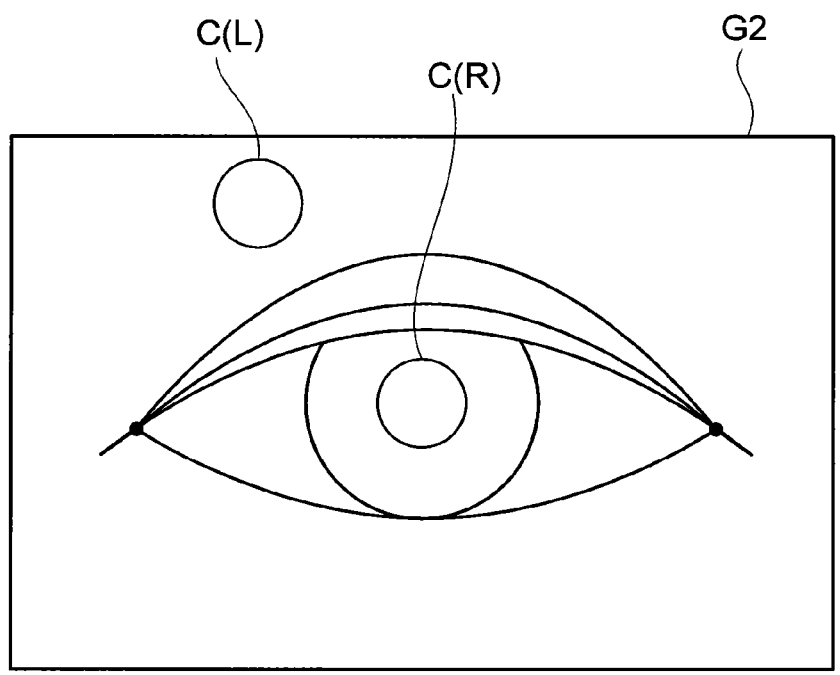
FIG. 5 is a diagram illustrating the outline of a red eye detection method.

When it is determined in Step S13 that the current flow is the first flow, the ECU 20 detects the red eye with the template matching using the red-eye template which is prepared in advance (Step S14). The red-eye template which is prepared in advance is a template indicating the red eye when the degree of eye opening is 100%. The process in Step S14 is performed by the red-eye detection unit 22. First, the red-eye detection unit 22 sets a red-eye search region from the face position region G1 (see FIG. 4) set in Step S12. FIG. 5 is a diagram illustrating the outline of a red-eye detection method. As shown in FIG. 5, the red-eye search region G2 is a rectangular region partitioned by, for example, a segment which is arranged outside the outer corner of the eye and extends in the up-down direction, a segment which is arranged inside the inner corner of the eye and extends in the up-down direction, a segment which is arranged above a segment connecting the outer corner of the eye and the inner corner of the eye and extends in the left-right direction, and a segment which is arranged below the segment connecting the outer corner of the eye and the inner corner of the eye and extends in the left-right direction. Then, the red-eye detection unit 22 performs template matching for the red-eye search region G2 using the red-eye template which is prepared in advance to detect red-eye candidates C. In addition, the red-eye detection unit 22 detects a pixel pattern that is greater than a predetermined threshold value as the red-eye candidate C using the template matching.

As shown in the red-eye search region G2 of FIG. 5, LED light L reflected from the eye or eyelid of the driver is included in the red-eye search region G2. The pixel pattern of the LED light L is similar to the pixel pattern of a red eye R. Therefore, the red-eye detection unit 22 detects the true red eye R as the red-eye candidate C and also detects the LED light L as the red-eye candidate C. As a result, in Step S14, two red-eye candidates C are detected. The red-eye detection unit 22 determines the red-eye candidate C with the pixel pattern which is best matched with the red-eye template to be the red eye R.

When it is determined in Step S13 that the current flow is the first flow, the ECU 20 detects the red eye with template matching using the red-eye template which has been updated in the previous frame (Step S15). The red-eye template which has been updated in the previous frame (process) is a red-eye template which is updated in Step S18 (which will be described in detail below) of the previous frame. The process in Step S15 is performed by the red-eye detection unit 22, similarly to Step S14. The process in Step S15 is basically similar to the process in Step S14 except for only the red-eye template used. Therefore, the detailed description of Step S15 will be omitted.

Then, the ECU 20 calculates the degree of eye opening (Step S16). The process in Step S16 is performed by the eye opening degree calculation unit 23. First, the eye opening degree calculation unit 23 detects the upper and lower eyelids from the feature points, such as the inner corner of the eye and the outer corner of the eye detected in Step S12.

Figure 6:
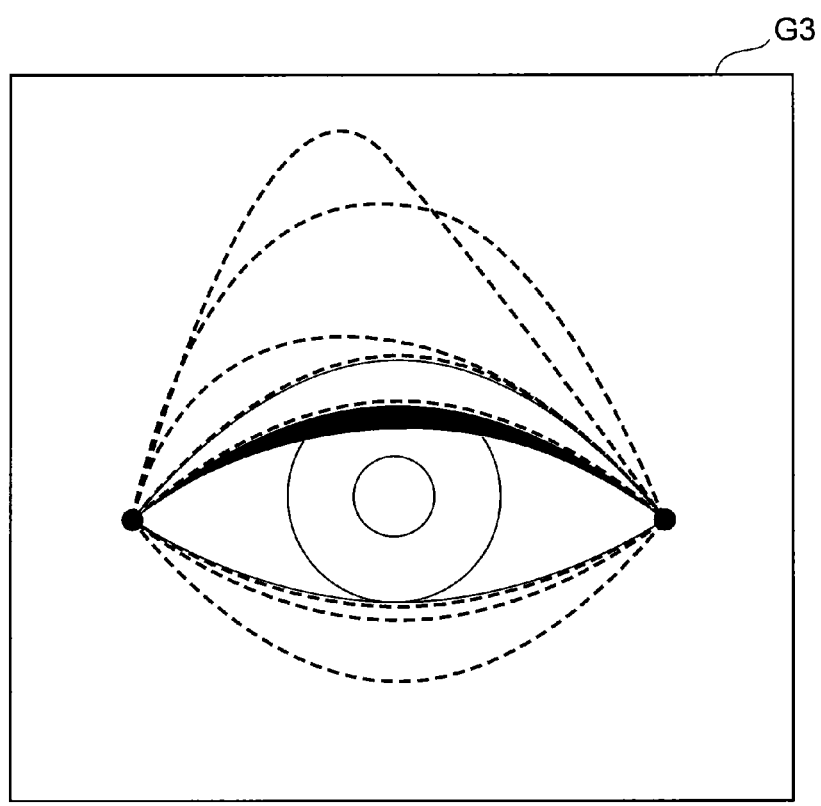
FIG. 6 is a diagram illustrating the outline of a method of detecting the upper and lower eyelids.

Next, a method of detecting the upper and lower eyelids will be described with reference to FIG. 6. FIG. 6 is a diagram illustrating the outline of the method of detecting the upper and lower eyelids. As shown in FIG. 6, the eye opening degree calculation unit 23 applies, for example, a Sobel filter to the face position region G1 set in Step S12 to generate an edge image G3 which is an edge-enhanced image. Then, the eye opening degree calculation unit 23 projects a plurality of curves which have the feature points, such as the outer corner of the eye and the inner corner of the eye detected in Step S2, as a starting point and an end point to calculate the strength of the edge (the pixel value of the edge image) on the curves. For example, a Bézier curve is used as the curve. Then, the eye opening degree calculation unit 23 selects the curves with high edge strength from the calculated edge strength and uses the selected curves as an upper eyelid curve and a lower eyelid curve. In this case, the eye opening degree calculation unit 23 excludes the curve below the red eye R detected in Step S14 or S15 from the candidates of the upper eyelid and excludes the curve above the red eye R detected in Step S14 or S15 from the candidates of the lower eyelid.

Then, the eye opening degree calculation unit 23 calculates the Y coordinate of the midpoint of the upper eyelid curve and the Y coordinate of the midpoint of the lower eyelid curve and calculates the degree of eye opening [pix] on the basis of the difference between the Y coordinates of the upper and lower eyelids. The degree of eye opening is represented in a pixel unit. A method of calculating the degree of eye opening is not limited to the above-mentioned method, but other known methods may be used.

Then, the ECU 20 calculates the relative degree of eye opening [%] which is 0% in an eye-closed state and is 100% in an eye-open state from the degree of eye opening [pix] calculated in Step S16 (Step S17). The process in Step S17 is performed by the relative eye opening degree calculation unit 24.

Figure 7:
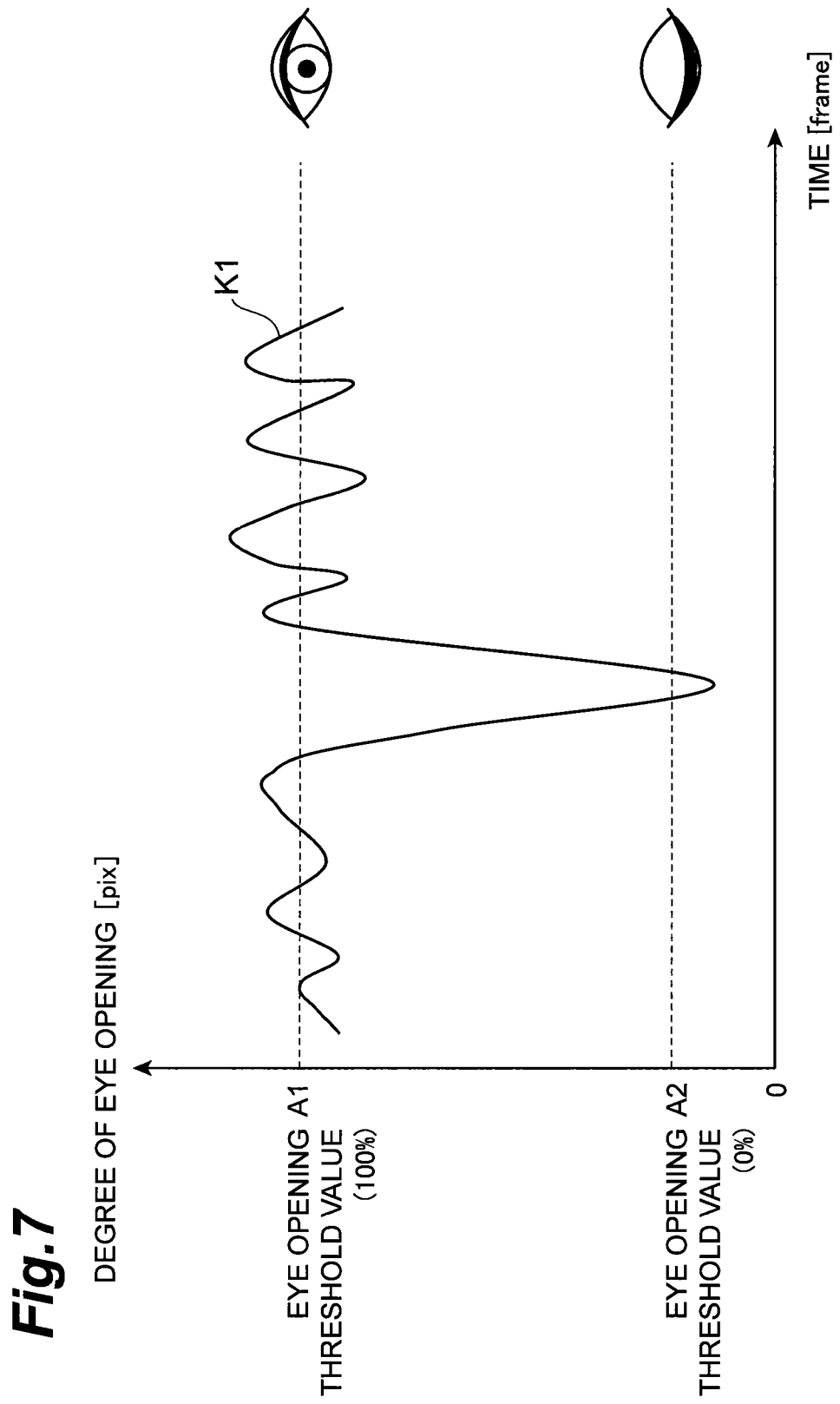
FIG. 7 is a diagram illustrating the outline of a method of calculating the relative degree of eye opening.

Next, a method of calculating the relative degree of eye opening will be described with reference to FIG. 7. FIG. 7 is a diagram illustrating the outline of the method of calculating the relative degree of eye opening and is a time-eye opening degree graph illustrating the waveform K1 of the degree of eye opening over time. As shown in FIG. 7, the relative eye opening degree calculation unit 24 sets the predetermined degrees of eye opening as an eye opening threshold value A1 and an eye closing threshold value A2 in advance and plots the degree of eye opening [pix] calculated in Step S16 on the eye opening degree-time graph. Then, the relative eye opening degree calculation unit 24 updates the average value of the degrees of eye opening greater than the set eye opening threshold value A1 with the eye opening threshold value A1 and updates the average value of the degrees of eye opening less than the set eye closing threshold value A2 with the eye closing threshold value A2. Then, the relative eye opening degree calculation unit 24 calculates the relative degree of eye opening [%] in which the updated eye opening threshold value A1 is 100% and the updated eye closing threshold value A2 is 0% from the degree of eye opening calculated by the eye opening degree calculation unit 23.

Then, the ECU 20 updates the red-eye template on the basis of the relative degree of eye opening calculated in Step S18 (Step S18). The process in Step S18 is performed by the red-eye template update unit 25.

Figure 8:
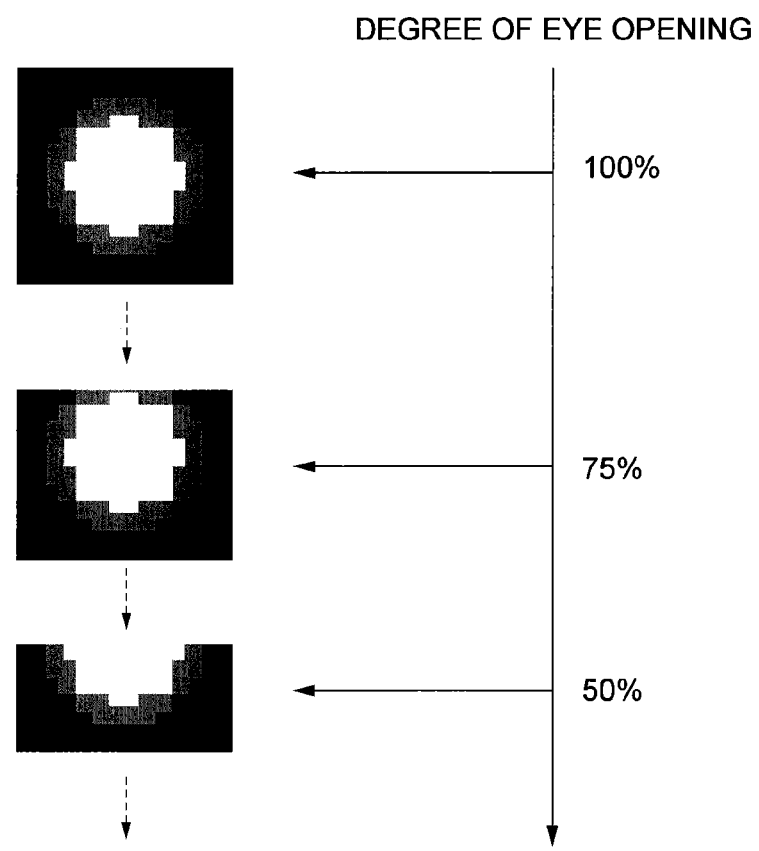
FIG. 8 is a diagram illustrating the outline of the relationship between the relative degree of eye opening and the shape of a red-eye template.

Next, a process of updating the red-eye template will be described with reference to FIG. 8. FIG. 8 is a diagram illustrating the outline of the relationship between the relative degree of eye opening and the shape of the red-eye template. As shown in FIG. 8, the shape of the red eye in the image is proportional to the relative degree of eye opening. That is, when the relative degree of eye opening is 100%, the shape of the red eye in the image is 100%. When the relative degree of eye opening is 75%, the shape of the red eye in the image is 75%. When the relative degree of eye opening is 50%, the shape of the red eye in the image is 50%. When the relative degree of eye opening is 0%, no red eye is included in the image. The red-eye template update unit 25 generates a red-eye template with a shape corresponding to the relative degree of eye opening calculated in Step S17 and updates the red-eye template used for template matching for the next frame with the generated red-eye template.

Specifically, the red-eye template update unit 25 compares the relative degree of eye opening which is calculated in Step S17 in the previous frame and the relative degree of eye opening which is calculated in Step S17 in the current frame and determines whether there is a change in the relative degree of eye opening between the previous frame and the current frame. Then, when it is determined that there is no change in the relative degree of eye opening between the previous frame and the current frame, the red-eye template update unit 25 ends the process in Step S18, without updating the red-eye template. On the other hand, when it is determined that there is a change in the relative degree of eye opening between the previous frame and the current frame, the red-eye template update unit 25 generates a red-eye template with a shape corresponding to the relative degree of eye opening which is calculated in Step S17 in the current frame and updates the red-eye template used for template matching for the next frame with the generated red-eye template.

In Step S18, the red-eye template update unit 25 may select a registered red-eye template, instead of generating the red-eye template. Specifically, plural types of red-eye templates with shapes corresponding to the predetermined relative degrees of eye opening are registered in advance. Then, when the process starts, the red-eye template update unit 25 selects a red-eye template with a shape corresponding to the relative degree of eye opening which is calculated in Step S17 in the current frame from the plurality of registered red-eye templates in Step S18. Then, the red-eye template update unit 25 updates the red-eye template used for template matching for the next frame with the selected red-eye template.

As described above, according to the red-eye detection device 1 of the first embodiment, the red-eye template corresponding to the relative degree of eye opening is generated. Therefore, even when the shape of the red eye varies depending on the degree of eye opening, it is possible to detect the red eye with high accuracy.

In the next template matching, it is possible to use the red-eye template corresponding to the relative degree of eye opening. Therefore, it is possible to improve the accuracy of detecting the red eye.

In addition, the degree of eye opening is represented by the relative degree of eye opening. Therefore, even when the distance from the upper eyelid to the lower eyelid in the face image varies depending on the distance from the image sensor 10 to the face of the driver or the difference between individuals, it is possible to normalize the degree of eye opening. As a result, it is possible to appropriately generate a red-eye template.

Since the degree of eye opening is directly calculated from the image, it is possible to improve the reliability of the degree of eye opening.

[Second Embodiment]

Next, a red-eye detection device 2 according to a second embodiment will be described. The second embodiment is basically similar to the first embodiment, but differs from the first embodiment in that the degree of eye opening is estimated on the basis of the degree of drowsiness. Therefore, hereinafter, only the difference from the first embodiment will be described and the description of the same components as those in the first embodiment will not be repeated.

Figure 9:
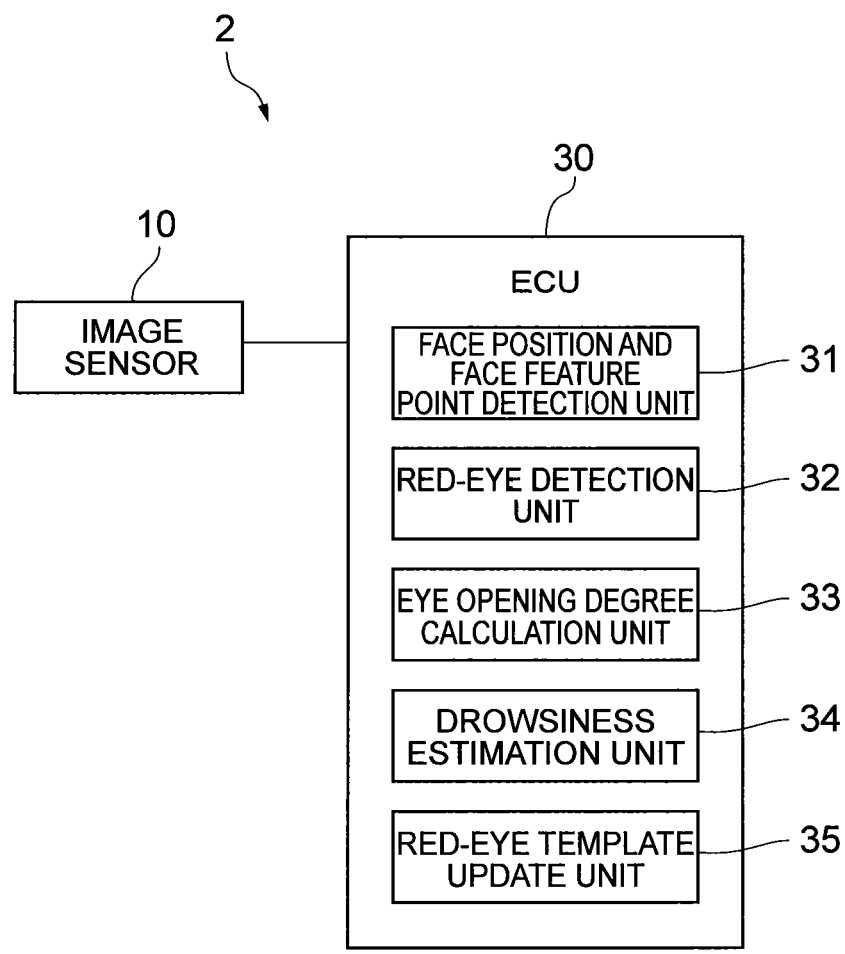
FIG. 9 is a block diagram illustrating the structure of a red-eye detection device according to a second embodiment.

FIG. 9 is a block diagram illustrating the structure of the red-eye detection device according to the second embodiment. As shown in FIG. 9, the red-eye detection device 2 according to the second embodiment includes an image sensor 10 and an ECU 30.

The ECU 30 is a computer of a vehicle device which performs electronic control and includes, for example, a CPU, a memory, such as a ROM or a RAM, and an input/output interface.

The ECU 30 is connected to the image sensor 10 and includes a face position and face feature point detection unit 31, a red-eye detection unit 32, an eye opening degree calculation unit 33, a drowsiness estimation unit 34, and a red-eye template update unit 35.

The face position and face feature point detection unit 31, the red-eye detection unit 32, and the eye opening degree calculation unit 33 are the same as the face position and face feature point detection unit 21, the red-eye detection unit 22, and the eye opening degree calculation unit 23 according to the first embodiment, respectively.

The drowsiness estimation unit 34 has a function of calculating a blink feature amount from the degree of eye opening calculated by the eye opening degree calculation unit 23 and estimating the degree of drowsiness (drowsiness degree) of the driver on the basis of the calculated blink feature amount.

For example, the time when the eyes are closed is used at a predetermined time as the blink feature amount. The drowsiness estimation unit 34 estimates the degree of drowsiness of the driver on the basis of, for example, the relationship between the degree of drowsiness and the blink feature amount which is learned in advance.

The red-eye template update unit 35 has a function of updating the red-eye template on the basis of the degree of drowsiness estimated by the drowsiness estimation unit 34. Specifically, plural types of red-eye templates with shapes corresponding to the predetermined relative degrees of eye opening are registered in advance. The red-eye template update unit 35 selects a red-eye template corresponding to the degree of drowsiness estimated by the drowsiness estimation unit 34 from the plurality of registered red-eye templates. Then, the red-eye template update unit 35 updates the red-eye template used for the next template matching with the selected red-eye template. That is, the red-eye template update unit 35 indirectly estimates the degree of drowsiness from the degree of eye opening estimated by the drowsiness estimation unit 34. Then, the red-eye template update unit 35 selects a red-eye template corresponding to the estimated degree of eye opening from the plurality of registered red-eye templates to generate the red-eye template and updates the red-eye template used for the next template matching with the generated red-eye template.

Figure 10:
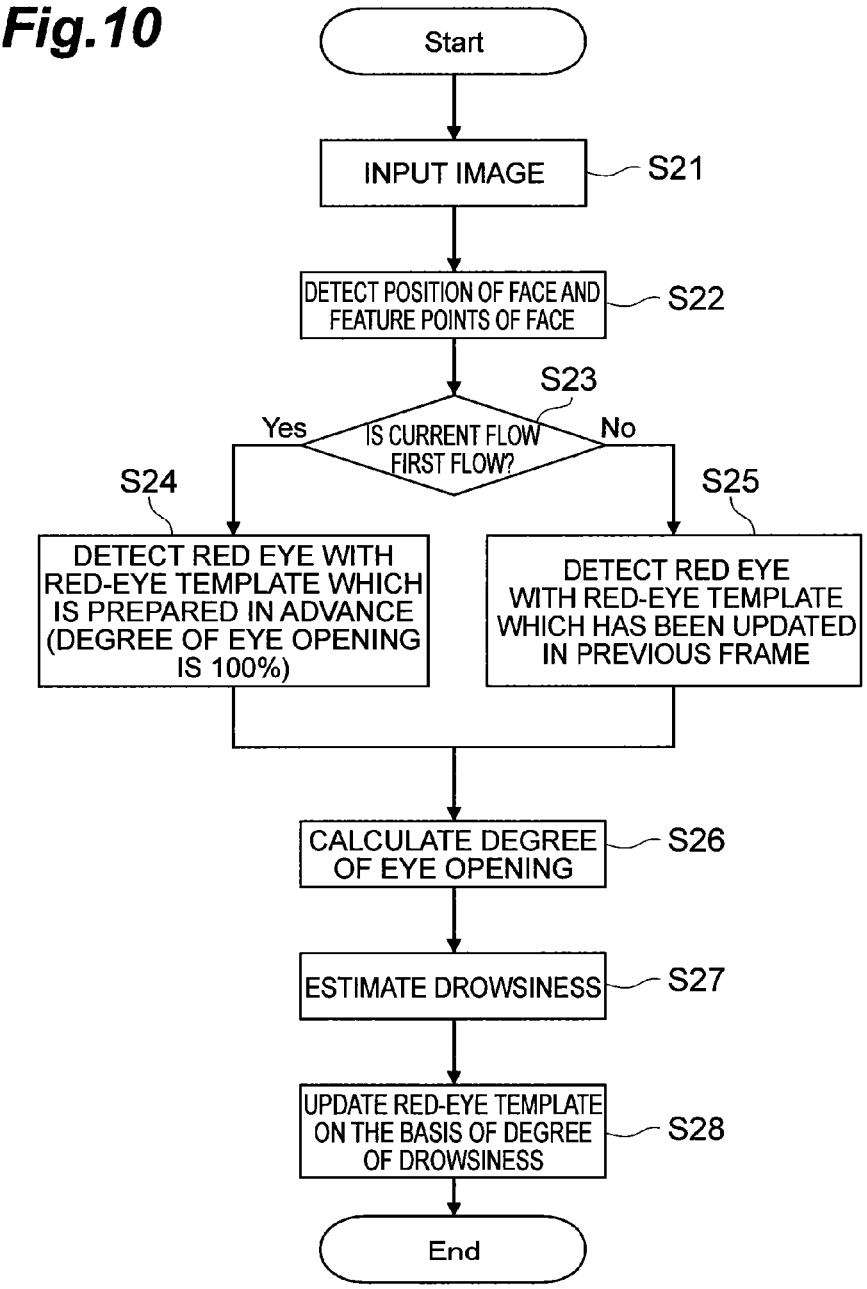
FIG. 10 is a flowchart illustrating a red-eye detection process of the red-eye detection device according to the second embodiment.

Next, the operation of the red-eye detection device 2 according to the second embodiment will be described. FIG. 10 is a flowchart illustrating a red-eye detection process of the red-eye detection device according to the second embodiment. The process shown in FIG. 10 is performed under the control of the ECU 30 and is repeatedly performed at a predetermined interval, for example, during the period from the time when an ignition is turned on to the time when the ignition is turned off. In addition, the unit of a series of processes shown in FIG. 10 is referred to as a frame. Therefore, the current frame means a series of processes shown in FIG. 10 which is currently performed and a previous frame means a series of processes shown in FIG. 10 which has been previously performed.

As shown in FIG. 10, first, the ECU 30 inputs the image of the driver captured by the image sensor 10 (Step S21). The process in Step S21 is the same as the process in Step S11 in the first embodiment.

Then, the ECU 30 detects the position of the face and the feature points of the face (Step S22). The process in Step S22 is the same as the process in Step S12 in the first embodiment.

Then, the ECU 30 determines whether the current flow is a first flow (Step S23). When it is determined that the current flow is the first flow (Step S23: YES), the ECU 30 proceeds to Step S24. When it is determined that the current flow is not the first flow (Step S23: NO), the ECU 30 proceeds to Step S25.

When it is determined in Step S23 that the current flow is the first flow, the ECU 30 detects the red eye with template matching using the red-eye template which is prepared in advance (Step S24). The process in Step S24 is the same as the process in Step S14 in the first embodiment.

When it is determined in Step S23 that the current flow is the first flow, the ECU 30 detects the red eye with template matching using the red-eye template updated in the previous frame (Step S25). The red-eye template updated in the previous frame is a red-eye template which is updated in Step S28 (which will be described in detail below) in the previous frame. The process in Step S25 is performed by the red-eye detection unit 22, similarly to Step S24. The process in Step S25 is basically similar to the process in Step S24 except for only the red-eye template used. Therefore, the detailed description of Step S25 will be omitted.

Then, the ECU 30 calculates the degree of eye opening (Step S26). The process in Step S26 is the same as the process in Step S16 in the first embodiment.

Then, the ECU 30 estimates the degree of drowsiness of the driver (Step S27). The process in Step S27 is performed by the drowsiness estimation unit 34. First, the drowsiness estimation unit 34 calculates a blink feature amount, which is a feature amount correlated with drowsiness, on the basis of the degree of eye opening calculated in Step S26. The blink feature amount is a physical amount obtained by acquiring an eye closing period for which the eyes are closed among the states of the eyes for a predetermined period (for example, 10 seconds) and calculating the ratio of the eye closing period to the predetermined period. Then, the drowsiness estimation unit 34 estimates the degree of drowsiness of the driver on the basis of the calculated blink feature amount.

Figure 11:
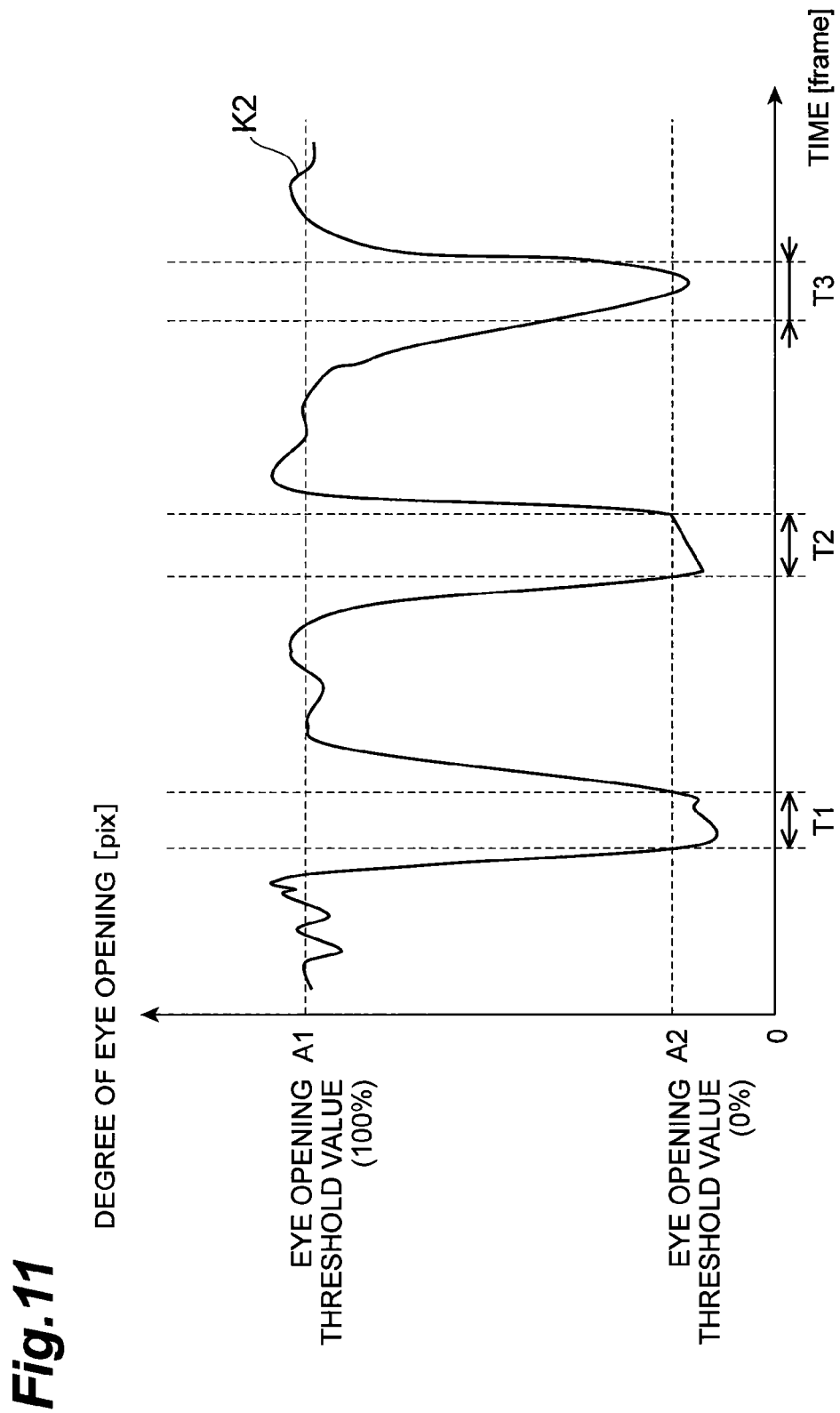
FIG. 11 is a diagram illustrating the outline of a blink feature amount calculation method.

Next, a method of calculating the blink feature amount will be described with reference to FIG. 11. FIG. 11 is a diagram illustrating the outline of the method of calculating the blink feature amount and shows a time-eye opening degree graph illustrating the waveform K2 of the degree of eye opening over time. In FIG. 11, periods T1 and T2 are periods for which the degree of eye opening is equal to or less than an eye closing threshold value A2, that is, eye closing periods. In FIG. 11, a period T3 is a section in which the degree of eye opening is not detected in Step S26. In this case, the drowsiness estimation unit 34 sets a predetermined period except for the period T3 and calculates the ratio of the eye closing period to the set predetermined period as the blink feature amount. That is, the drowsiness estimation unit 34 calculates the blink feature amount except for information about the period for which the degree of eye opening is not detected in Step S26. In Step S27, any physical amount may be used as the feature amount other than the blink feature amount as long as it is correlated with drowsiness.

Figure 12:
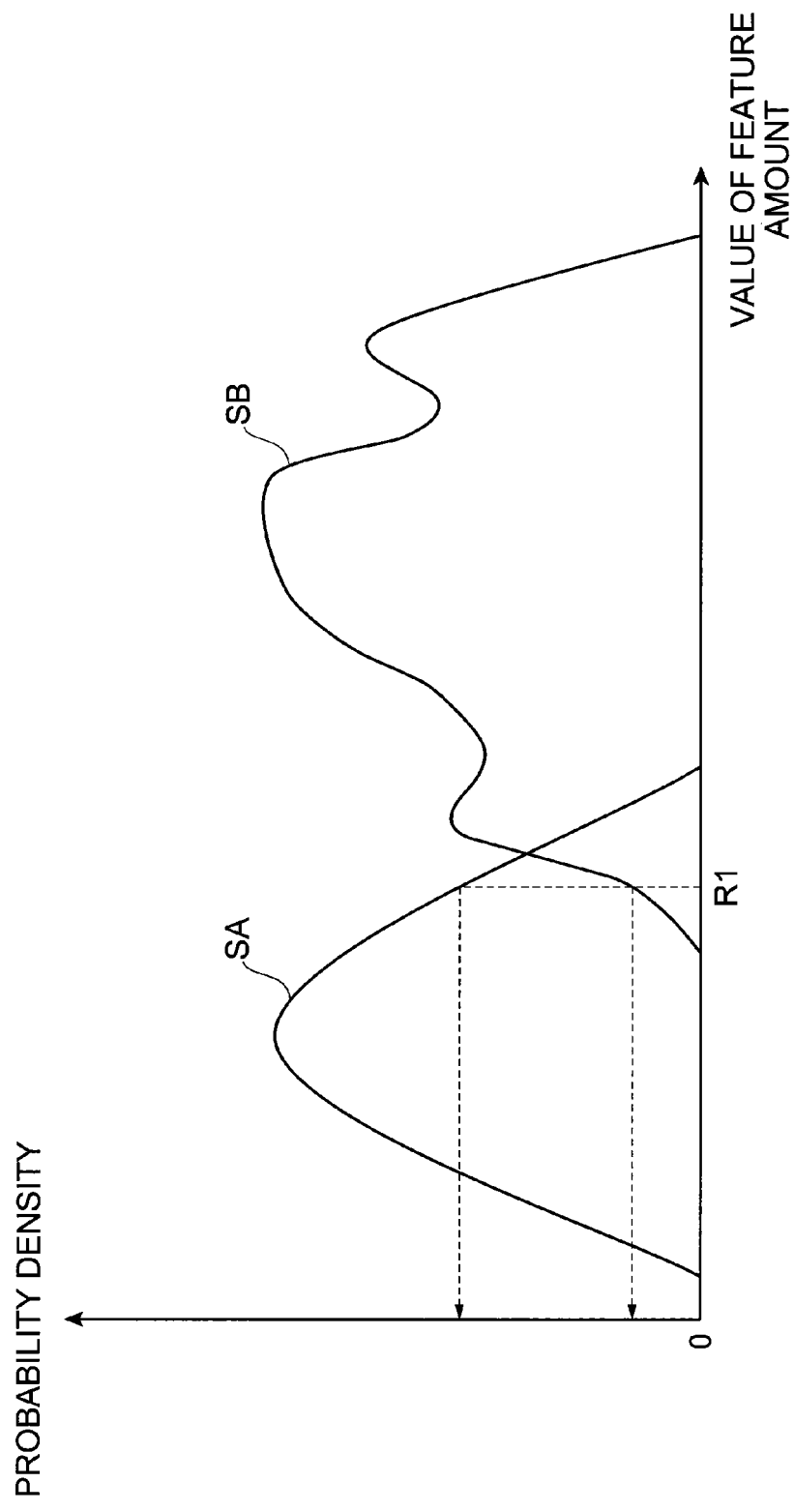
FIG. 12 is a diagram illustrating the outline of a method of estimating the degree of drowsiness.

Next, a method of estimating the degree of drowsiness of the driver will be described with reference to FIG. 12. FIG. 12 is a diagram illustrating the outline of the method of estimating the degree of drowsiness and shows the relationship between the blink feature amount and probability density. FIG. 12 shows the statistical distribution of each degree of drowsiness (probability density with respect to the blink feature amount) which is represented by two-step evaluation. The statistical distribution when the degree of drowsiness is small is SA and the statistical distribution when the degree of drowsiness is large is SB. The statistical distributions SA and SB are acquired by, for example, an off-line preliminary learning process. When the calculated blink feature amount is R1, the drowsiness estimation unit 34 calculates the probability densities of the statistical distribution SA and the statistical distribution SB when the blink feature amount is R1 and estimates the degree of drowsiness on the basis of the magnitude relationship between the calculated probability densities. In addition, the method of calculating the degree of drowsiness is not limited to the above-mentioned method, but other known methods may be used. The degree of drowsiness can be represented by for example, six-step evaluation of 0 to 5 steps. For example, a degree of drowsiness of 0 indicates a state in which the driver is fully awake, a degree of drowsiness of 1 indicates a state in which the driver is not drowsy, a degree of drowsiness of 2 indicates a state in which the driver is little drowsy, a degree of drowsiness of 3 indicates a state in which the driver is slightly drowsy, a degree of drowsiness of 4 indicates a state in which the driver is too drowsy, and a degree of drowsiness of 5 indicates a state in which the driver is nearly falling asleep.

Then, the ECU 30 updates the red-eye template on the basis of the degree of drowsiness estimated in Step S27 (Step S28). The process in Step S28 is performed by the red-eye template update unit 35.

Figure 13:
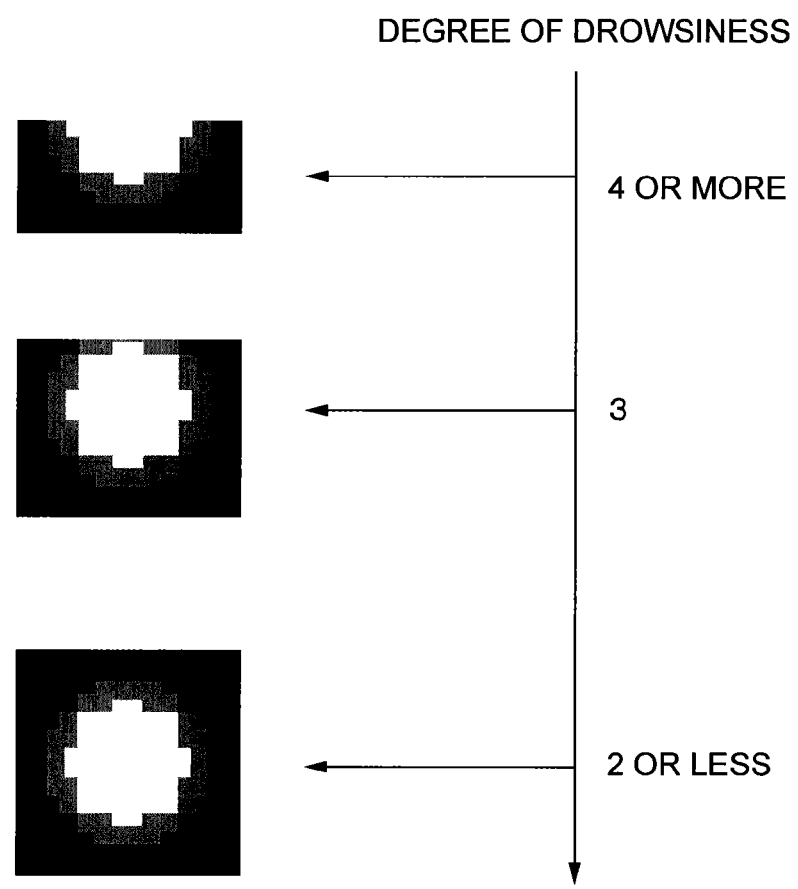
FIG. 13 is a diagram illustrating the outline of the relationship between the degree of drowsiness and the shape of a red-eye template.

Next, a method of updating the red-eye template will be described with reference to FIG. 13. FIG. 13 is a diagram illustrating the outline of the relationship between the degree of drowsiness and the shape of the red-eye template. In general, the degree of eye opening of a person varies depending on the degree of drowsiness. As the degree of drowsiness increases, the degree of eye opening is reduced. That is, as the degree of drowsiness is reduced, the degree of eye opening is increased and the shape of the red eye in the face image of the driver is increased. When the degree of drowsiness increases, the degree of eye opening is reduced and the shape of the red eye in the face image of the driver is reduced. As shown in FIG. 13, a plurality of red-eye templates corresponding to the degrees of drowsiness are registered in the red-eye template update unit 35. Each of the registered red-eye templates has a shape corresponding to the degree of drowsiness and the shape is the shape of the red eye corresponding to the degree of eye opening which corresponds to the degree of drowsiness. Then, the red-eye template update unit 35 selects a red-eye template corresponding to the degree of eye opening which corresponds to the degree of drowsiness estimated in Step S27 from the plurality of registered red-eye templates and updates the red-eye template used for template matching in the next frame with the selected red-eye template. That is, the red-eye template update unit 35 estimates the degree of eye opening on the basis of the degree of drowsiness and updates the red-eye template on the basis of the estimated degree of eye opening.

Specifically, the red-eye template update unit 35 compares the degree of drowsiness estimated in Step S27 in the previous frame with the degree of drowsiness estimated in Step S27 in the current frame and determines whether there is a change in the degree of drowsiness between the previous frame and the current frame. Then, when it is determined that there is no change in the degree of drowsiness between the previous frame and the current frame, the red-eye template update unit 35 ends the process Step S28, without updating the red-eye template. On the other hand, when it is determined that there is a change in the degree of drowsiness between the previous frame and the current frame, the red-eye template update unit 35 selects a red-eye template with a shape corresponding to the degree of drowsiness which is estimated in Step S27 in the current frame and updates the red-eye template used for template matching in the next frame with the selected red-eye template.

In Step S28, the red-eye template update unit 35 may generate the red-eye template, instead of selecting the red-eye template from the registered information. Specifically, the red-eye template update unit 35 estimates the shape of the red eye from the degree of drowsiness estimated in Step S27 and generates a red-eye template with the estimated shape. Then, the red-eye template update unit 35 updates the red-eye template used for template matching in the next frame with the generated red-eye template.

The correlation between the degree of drowsiness and a red eye pattern may be learned for a predetermined period immediately after the process starts and the red-eye template update unit 35 may generate the red-eye template on the basis of the learned correlation between the degree of drowsiness and the red eye pattern in Step S28.

As described above, according to the red-eye detection device 2 of the second embodiment, it is possible to indirectly calculate the degree of eye opening from the degree of drowsiness. In addition, even when the degree of eye opening varies depending on the degree of drowsiness, it is possible to detect the red eye with high accuracy.

[Third Embodiment]

Next, a red-eye detection device 3 according to a third embodiment will be described. The third embodiment is basically similar to the first embodiment and differs from the first embodiment in that the correlation between the degree of eye opening and the size of the red eye is learned and the red-eye template is updated on the basis of the learned correlation. Therefore, hereinafter, only the difference from the first embodiment will be described and the description of the same components as those in the first embodiment will not be repeated.

Figure 14:
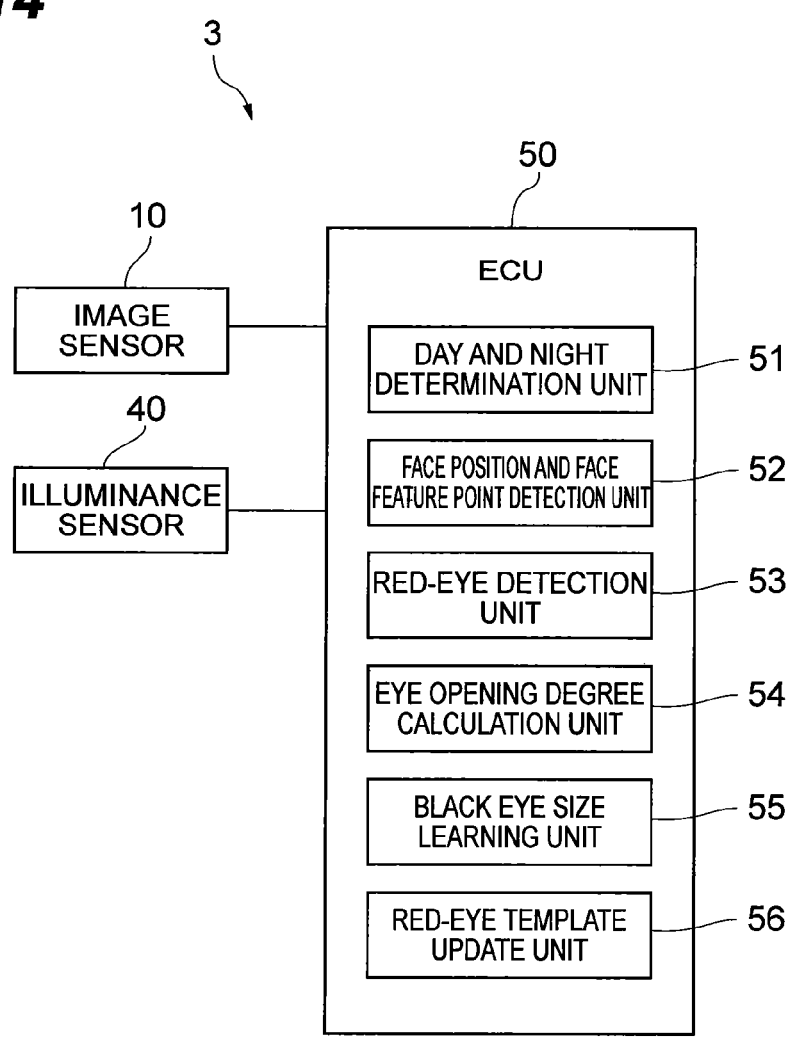
FIG. 14 is a block diagram illustrating the structure of a red-eye detection device according to a third embodiment.

FIG. 14 is a block diagram illustrating the structure of the red-eye detection device according to the third embodiment. As shown in FIG. 14, a red-eye detection device 3 according to the third embodiment includes an image sensor 10, an illuminance sensor 40, and an ECU 50.

The illuminance sensor 40 measures an out-vehicle light amount. The out-vehicle light amount means the amount of light outside the vehicle. Therefore, the amount of light outside the vehicle is large in the daytime and is small at night. For example, a photoelectric conversion element which is fixed in the vicinity of the window of the vehicle is used as the illuminance sensor 40. The illuminance sensor 40 outputs the measured amount of light outside the vehicle to the ECU 50.

The ECU 50 is a computer of a vehicle device which performs electronic control and includes, for example, a CPU, a memory, such as a ROM or a RAM, and an input/output interface.

The ECU 50 is connected to the image sensor 10 and the illuminance sensor 40 and includes a day and night determining unit 51, a face position and face feature point detection unit 52, a red-eye detection unit 53, an eye opening degree calculation unit 54, a black eye size learning unit 55, and a red-eye template update unit 56.

The red-eye detection unit 53 and the eye opening degree calculation unit 54 are the same as the red-eye detection unit 22 and the eye opening degree calculation unit 23 according to the first embodiment, respectively.

The day and night determining unit 51 has a function of determining whether it is day where the amount of light outside the vehicle is large or night where the amount of light outside the vehicle is small. The day and night determination unit 51 determines whether it is day or night on the basis of, for example, the amount of light outside the vehicle which is output from the illuminance sensor 40 or the total brightness of the image which is output from the image sensor 10.

The face position and face feature point detection unit 52 is basically similar to the face position and face feature point detection unit 21 in the first embodiment and further includes a function of detecting a black eye and calculating the size of the detected black eye. The black eye can be detected by for example, template matching using a black eye template.

The black eye size learning unit 55 has a function of learning the correlation between the size of the black eye detected by the face position and face feature point detection unit 52 and the degree of eye opening calculated by the eye opening degree calculation unit 54.

The red-eye template update unit 56 has a function of estimating the degree of eye opening and updating the red-eye template on the basis of the estimated degree of eye opening and the correlation between the degree of eye opening and the size of the black eye learned by the black eye size learning unit 55.

Figure 15:
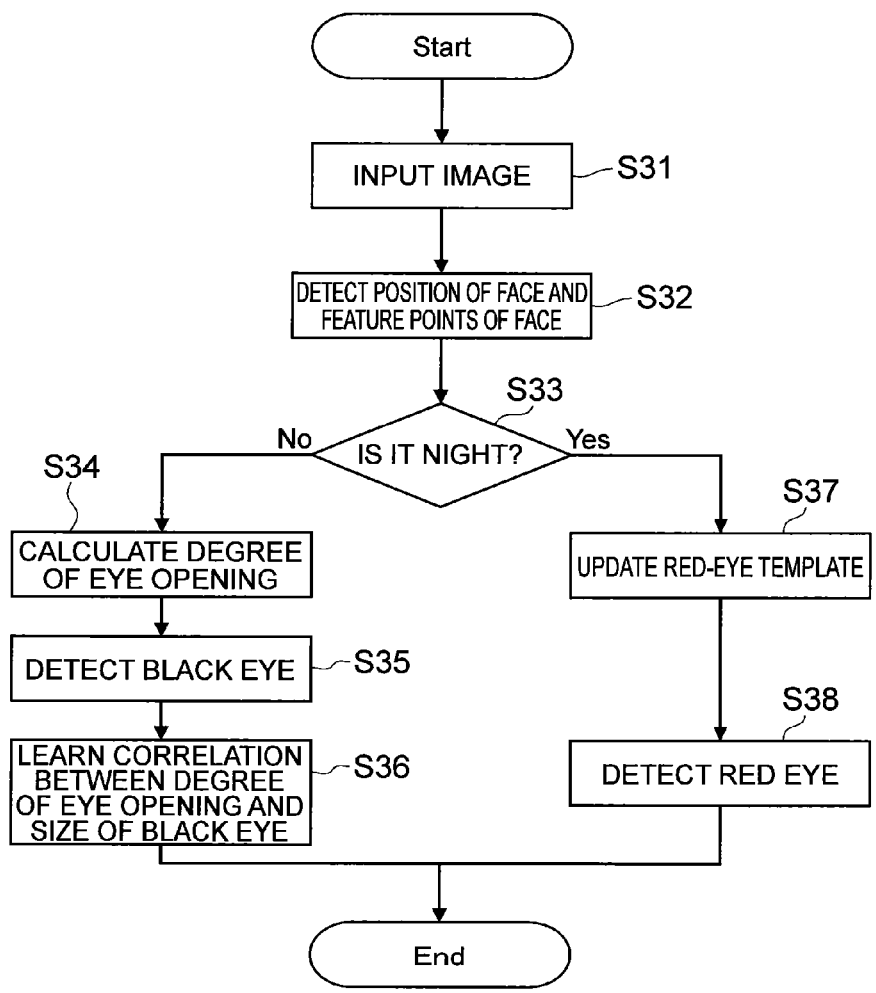
FIG. 15 is a flowchart illustrating a red-eye detection process of the red-eye detection device according to the third embodiment.

Next, the operation of the red-eye detection device 3 according to the third embodiment will be described. FIG. 15 is a flowchart illustrating a red-eye detection process of the red-eye detection device according to the third embodiment. The process shown in FIG. 15 is performed under the control of the ECU 50 and is repeatedly performed at a predetermined interval, for example, during the period from the time when an ignition is turned on to the time when the ignition is turned off. The unit of a series of processes shown in FIG. 15 is referred to as a frame. Therefore, the current frame means a series of processes shown in FIG. 15 which is currently performed and a previous frame means a series of processes shown in FIG. 15 which has been previously performed.

As shown in FIG. 15, first, the ECU 50 inputs the image of the driver captured by the image sensor 10 (Step S31). The process in Step S31 is the same as the process in Step S11 in the first embodiment.

Then, the ECU 50 detects the position of the face and the feature points of the face (Step S32). The process in Step S32 is the same as the process in Step S12 in the first embodiment.

Then, the ECU 50 determines whether it is night (Step S33). The process in Step S33 is performed by the day and night determining unit 51. The day and night determination unit 51 determines whether it is day or night on the basis of the amount of light outside the vehicle which is output from the illuminance sensor 40 or the image which is output from the image sensor 10. When it is determined whether it is day or night on the basis of the amount of light outside the vehicle which is output from the illuminance sensor 40, first, the day and night determination unit 51 acquires the amount of light outside the vehicle which is output from the illuminance sensor 40. When the amount of light outside the vehicle is greater than a predetermined threshold value, the day and night determination unit 51 determines that it is day. When the amount of light outside the vehicle is equal to or less than the predetermined threshold value, the day and night determination unit 51 determines that it is night. On the other hand, when it is determined whether it is day or night on the basis of the image output from the image sensor 10, first, the day and night determination unit 51 acquires the image output from the image sensor 10. Then, the day and night determination unit 51 calculates the total brightness of each pixel of the image. When the total brightness is greater than a predetermined threshold value, the day and night determination unit 51 determines that it is day. When the total brightness is equal to or less than the predetermined threshold value, the day and night determination unit 51 determines that it is night.

When it is determined that it is day (Step S33: NO), the ECU 50 proceeds to Step S34. When it is determined that it is night (Step S33: YES), the ECU 50 proceeds to Step S37.

When it is determined in Step S33 that it is day, the ECU 50 calculates the degree of eye opening (Step S34). The process in Step S34 is the same as the process in Step S16 in the first embodiment.

Then, the ECU 50 detects the black eye (Step S35). The process in Step S35 is performed by the face position and face feature point detection unit 52. First, the face position and face feature point detection unit 52 sets a black eye search region from the face position region G1 (see FIG. 4) set in Step S32. The black eye search region is the same as the red-eye search region G2 (see 5). In addition, the face position and face feature point detection unit 52 detects the black eye from the black eye search region with, for example, template matching using the black eye template. A method of detecting the black eye is not limited to the above-mentioned method, but other known methods may be used. Then, the face position and face feature point detection unit 52 calculates the size of a portion of the black eye which is not covered by the eyelid.

Figure 16:
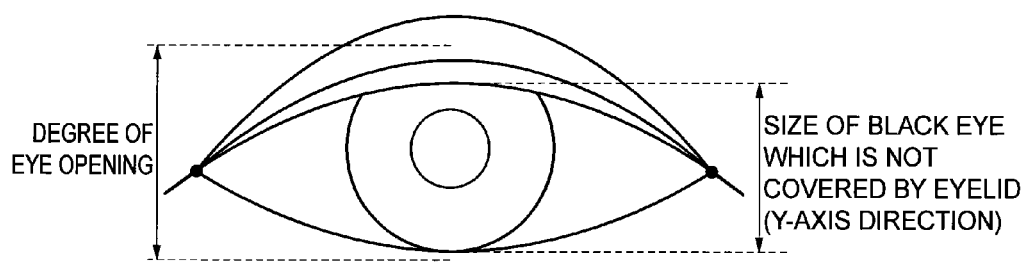
FIG. 16 is a diagram illustrating the outline of a method of calculating the size of a black eye.

Next, a method of calculating the size of the black eye will be described with reference to FIG. 16. FIG. 16 is a diagram illustrating the outline of the method of calculating the size of the black eye. As shown in FIG. 16, the degree of eye opening calculated in Step S34 is calculated by the difference between the Y coordinate of the middle point of an upper eyelid curve and the Y coordinate of the middle point of a lower eyelid curve. Therefore, the calculated degree of eye opening is not necessarily equal to the size of a portion of the black eye which is not covered by the eyelid. When the black eye is detected, the face position and face feature point detection unit 52 detects the Y coordinate of the uppermost end and the Y coordinate of the lowermost end of the detected black eye and calculates the difference between the detected Y coordinates. Then, the face position and face feature point detection unit 52 uses the calculation result as the size of a portion of the black eye which is not covered by the eyelid.

Figure 17:
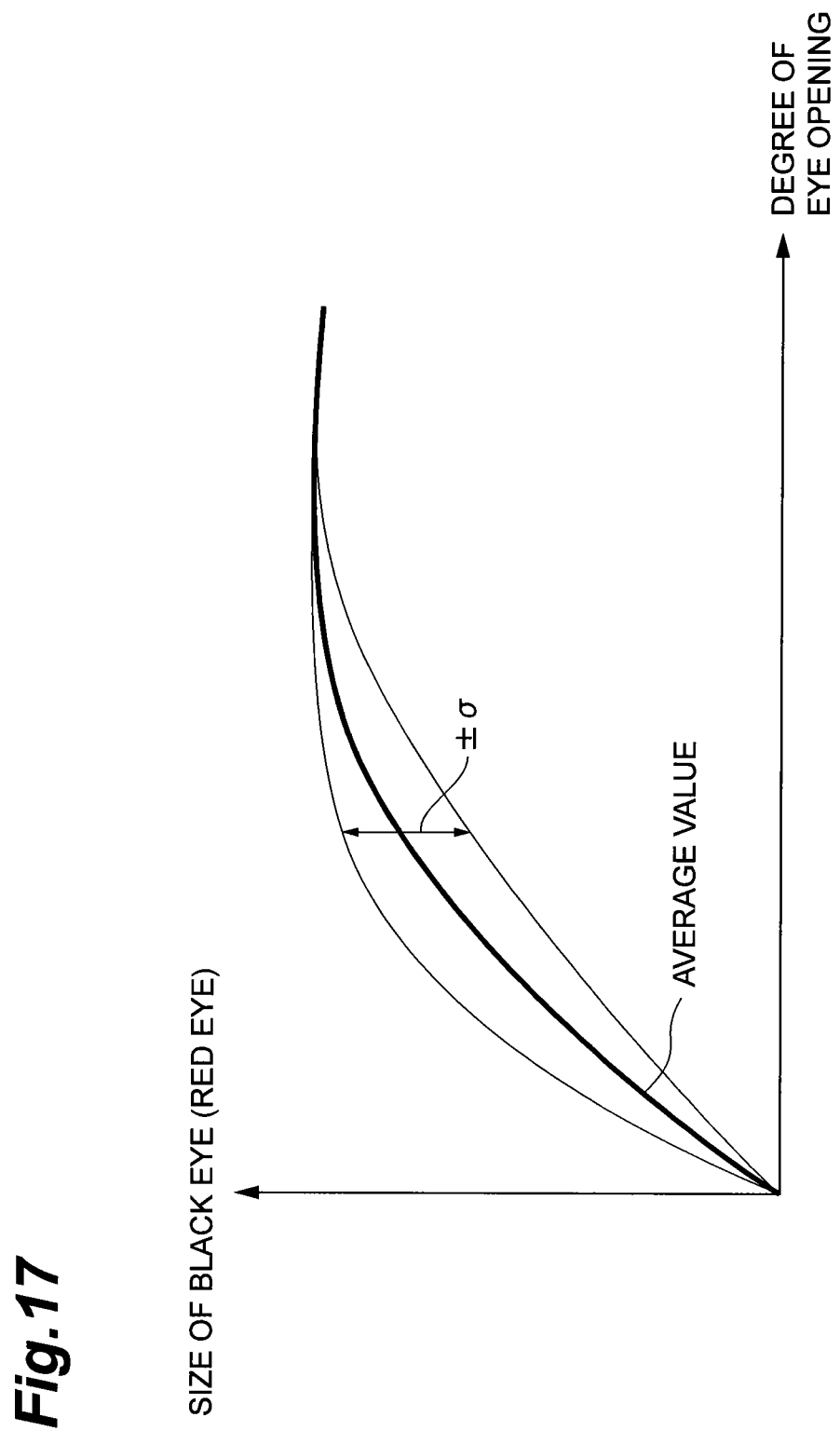
FIG. 17 is a graph illustrating the correlation between the degree of eye opening and the size of the black eye.

Then, the ECU 50 learns the correlation between the degree of eye opening and the size of the black eye (Step S36). The process in Step S36 is performed by the black eye size learning unit 55. FIG. 17 is an eye opening degree-black eye size graph illustrating the correlation between the degree of eye opening and the size of the black eye. The black eye size learning unit 55 includes the eye opening degree-black eye size graph shown in FIG. 17. The black eye size learning unit 55 plots the size of the black eye calculated in Step S35 with respect to the degree of eye opening calculated in Step S34 on the eye opening degree-black eye size graph shown in FIG. 17 to learn the size of the black eye with respect to the degree of eye opening. Then, the black eye size learning unit 55 calculates the average value and standard deviation σ of the size of the black eye with respect to the degree of eye opening.

Figure 18:
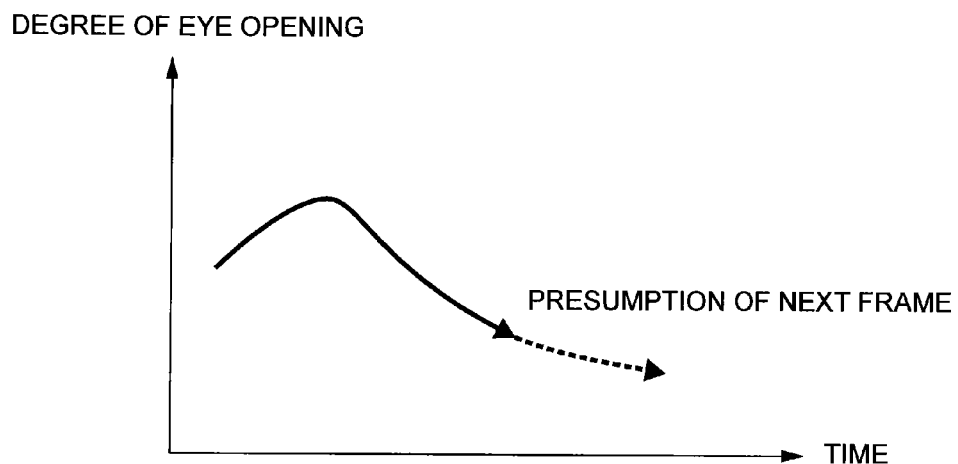
FIG. 18 is a diagram illustrating the outline of a method of estimating the degree of eye opening.

When it is determined in Step S33 that it is night, the ECU 50 updates the red-eye template (Step S37). The process in Step S37 is performed by the red-eye template update unit 56. FIG. 18 is a diagram illustrating the outline of a method of estimating the degree of eye opening. As shown in FIG. 18, first, the red-eye template update unit 56 records the value of the degree of eye opening detected in the previous frame and estimates the degree of eye opening in the current frame using a filter, such as a Kalman filter or a particle filter. A method of estimating the degree of eye opening is not limited to the above-mentioned method, but other known methods may be used. Then, the red-eye template update unit 56 calculates the size of the black eye at the estimated degree of eye opening, with reference to the eye opening degree-black eye size graph learned in Step S36. In this case, the red-eye template update unit 56 may calculate the size of one black eye using the average value of the eye opening degree-black eye size graph or may calculate the sizes of a plurality of black eyes using the standard deviation σ of the eye opening degree-black eye size graph. Then, the red-eye template update unit 56 generates a red-eye template corresponding to the calculated size of the black eye. When the sizes of a plurality of black eyes are calculated, a plurality of red-eye templates are generated. Then, the red-eye template update unit 25 updates the red-eye template used for the current template matching with the generated red-eye template.

Then, the ECU 50 detects the red eye with template matching using the red-eye template updated in Step S37 (Step S38). Step S38 is performed by the red-eye template update unit 56. The process in Step S38 is basically similar to the process in Step S14 in the first embodiment except for only the red-eye template used. Therefore, the detailed description of Step S38 will be omitted.

As described above, according to the red-eye detection device 3 according to the third embodiment, the correlation between the size of the black eye and the degree of eye opening is learned in the daytime where the amount of light outside the vehicle is large and the red-eye template with a size corresponding to the degree of eye opening is generated with reference to the correlation at night where the amount of light outside the vehicle is small. Therefore, it is possible to generate the red-eye template corresponding to the degree of eye opening with high accuracy.

The exemplary embodiments of the invention have been described above, but the invention is not limited to the above-described embodiments. For example, the first to third embodiments have been described as different embodiments, but some or all of the first to third embodiments may be appropriately combined with each. For example, the accuracy of the first embodiment is higher than that of the second embodiment and the processing load of the second embodiment is less than that of the first embodiment. Therefore, the process according to the first embodiment may be performed when the degree of drowsiness is small and the process according to the second embodiment may be performed when the degree of drowsiness is large. The process of estimating the degree of eye opening in the third embodiment may be performed in the first or second embodiment.

INDUSTRIAL APPLICABILITY

The invention can be used as a red-eye detection device which detects the red eye with template matching using a red-eye template.

REFERENCE SIGNS LIST

1 TO 3: RED-EYE DETECTION DEVICE
10: IMAGE SENSOR (OUT-VEHICLE LIGHT AMOUNT DETECTION MEANS)
20: ECU
21: FACE POSITION AND FACE FEATURE POINT DETECTION UNIT
22: RED-EYE DETECTION UNIT (RED-EYE DETECTION MEANS)
23: EYE OPENING DEGREE CALCULATION UNIT (EYE OPENING DEGREE CALCULATION MEANS)
24: RELATIVE EYE OPENING DEGREE CALCULATION UNIT
25: RED-EYE TEMPLATE UPDATE UNIT (RED-EYE TEMPLATE GENERATION MEANS)
30: ECU
31: FACE POSITION AND FACE FEATURE POINT DETECTION UNIT
32: RED-EYE DETECTION UNIT (RED-EYE DETECTION MEANS)
33: EYE OPENING DEGREE CALCULATION UNIT (EYE OPENING DEGREE CALCULATION MEANS)
34: DROWSINESS ESTIMATION UNIT (DROWSINESS DEGREE ESTIMATION MEANS)
35: RED-EYE TEMPLATE UPDATE UNIT (RED-EYE TEMPLATE GENERATION MEANS)
40: ILLUMINANCE SENSOR (OUT-VEHICLE LIGHT AMOUNT DETECTION MEANS)
50: ECU
51: DAY AND NIGHT DETERMINING UNIT (OUT-VEHICLE LIGHT AMOUNT DETECTION MEANS)
52: FACE POSITION AND FACE FEATURE POINT DETECTION UNIT (BLACK EYE DETECTION MEANS)
53: RED-EYE DETECTION UNIT (RED-EYE DETECTION MEANS)
54: EYE OPENING DEGREE CALCULATION UNIT (EYE OPENING DEGREE CALCULATION MEANS)
55: BLACK EYE SIZE LEARNING UNIT
56: RED-EYE TEMPLATE UPDATE UNIT (RED-EYE TEMPLATE GENERATION MEANS)
L: LED LIGHT
R: RED EYE
C: RED-EYE CANDIDATE
F1: IMAGE
G1: FACE POSITION REGION
G2: RED-EYE SEARCH REGION
G3: EDGE IMAGE
A1: EYE OPENING THRESHOLD VALUE
A2: EYE CLOSING THRESHOLD VALUE
SA: STATISTICAL DISTRIBUTION WHEN THE DEGREE OF DROWSINESS IS SMALL
SB: STATISTICAL DISTRIBUTION WHEN THE DEGREE OF DROWSINESS IS LARGE

The invention claimed is:

1. A red-eye detection device comprising:
an image sensor that captures a face image;
an eye opening degree calculation unit that calculates a relative degree of eye opening which is 0% in an eye-closed state and is 100% in an eye-open state from the face image captured by the image sensor;
a red-eye template generation unit that generates a red-eye template with a shape corresponding to the relative degree of eye opening calculated by the eye opening degree calculation unit; and
a red-eye detection unit that detects a red eye from the face image with template matching using the red-eye template which is generated by the template generation unit.

2. The red-eye detection device according to claim 1, wherein, when it is determined that there is a change in the relative degree of eye opening calculated by the eye opening degree calculation unit between previous calculation and current calculation, the red-eye template generation unit updates a red-eye template used for next template matching with the generated red-eye template.

3. A red-eye detection device comprising:
an image sensor that captures a face image;
an eye opening degree calculation unit that calculates a degree of eye opening from the face image captured by the image sensor;
a drowsiness estimation unit that estimates a degree of drowsiness from the degree of eye opening calculated by the eye opening degree calculation unit;
a red-eye template generation unit that generates a red-eye template with a shape corresponding to the degree of drowsiness estimated by the drowsiness estimation unit; and
a red-eye detection unit that detects a red eye from the face image with template matching using the red-eye template generated by the template generation unit.

4. A red-eye detection device comprising:
an image sensor that captures a face image;
an out-vehicle light amount detection unit that detects an amount of light outside a vehicle;
an eye opening degree calculation unit that calculates a degree of eye opening from the face image captured by the image sensor;
a black eye detection unit that detects a black eye from the face image captured by the image sensor; and a red-eye template generation unit that generates a red-eye template corresponding to the degree of eye opening calculated by the eye opening degree calculation unit,
wherein the red-eye template generation unit learns a correlation between the degree of eye opening and the size of the black eye at a time when the amount of light outside the vehicle detected by the out-vehicle light amount detection unit is large and generates a red-eye template with a size corresponding to the degree of eye opening with reference to the correlation at a time when the amount of light outside the vehicle detected by the out-vehicle light amount detection unit is small.

* * * * *